US005644739A

United States Patent [19]
Moursund

[11] Patent Number: 5,644,739
[45] Date of Patent: Jul. 1, 1997

[54] METHOD AND SYSTEM FOR ADDING BUTTONS TO A TOOLBAR

[75] Inventor: Elizabeth Ann Moursund, Bellevue, Wash.

[73] Assignee: Microsoft Corporation, Redmond, Wash.

[21] Appl. No.: 379,705

[22] Filed: Jan. 27, 1995

[51] Int. Cl.$^6$ .................................................. G06F 3/00
[52] U.S. Cl. ............................................................ 395/354
[58] Field of Search ................................. 395/155–166, 395/326–358; 345/117–120, 146, 902

[56] References Cited

U.S. PATENT DOCUMENTS 5,287,448  2/1994  Nicol et al. ............................. 395/159

OTHER PUBLICATIONS

1992 Microsoft Excel 4.0 User's Guide, Book 1, Contents, excerpts from Chapter 3 (What's new in version 4.0), Microsoft Corp., 1992, pp. 43–44.
1992 Microsoft Excel 4.0 User's Guide, Book 2, Contents excerpts from Chapter 4 (Customizing Microsoft Excel), Microsoft Corp., 1992, pp. 154–165.
1993 Microsoft Excel 5.0 User's Guide, Contents, excerpts from Chapter 34 (Customizing Your Workspace), Microsoft Corp, 1993, pp. 631–636.
Myers, "A Taxonomy of Window Manager User Interfaces", IEEE Comp. Graphics and Appl., Sep. 1988, pp. 65–84.
Foley et al, "Computer Graphics: Principles and Practice", Addison–Wesley Pub. Co., 1990, pp. 386–387, 435–451.
Cowart, "Mastering Windows 3.1", Sybex Inc., 1993, pp. 131–134.
Microsoft Excel 5.0c Screen Dumps and Help, Microsoft Corp., 1994, pp. 1–42.

Primary Examiner—Mark R. Powell
Assistant Examiner—John E. Breene
Attorney, Agent, or Firm—Jones & Askew, LLP

[57] ABSTRACT

The present invention provides a system and method for intuitively adding a button or other type of control to a toolbar or other region for holding the same. A control is added by dragging an object to a region for holding controls and dropping the object at the desired location of the control in the region. In response to the object being dropped in the region for holding controls, a control is created and bound to an operation of the object.

14 Claims, 10 Drawing Sheets

METHOD AND SYSTEM FOR ADDING BUTTONS TO A TOOLBAR

TECHNICAL FIELD

The present invention relates generally to the graphical manipulation of objects in a computing device, and more particularly to an improved system for, and method of, adding buttons to a toolbar.

BACKGROUND OF THE INVENTION

Computer operating systems frequently employ a graphical user interface to convey information to users via a monitor by various combinations of graphical items, including icons, text, drop-down menus, dialog boxes, and toolbars. A graphical user interface operates as part of the operating system and provides an interface to the operating system, and to application programs running in conjunction with the same, that allows users to access files and functions of the files. An operating system that provides such a graphical user interface is the "WINDOWS" operating system manufactured and sold by Microsoft Corporation of Redmond, Wash., the assignee of the present invention.

A user typically interacts with a graphical user interface by positioning a cursor over the graphical items with a mouse, or other input device, and actuating, or clicking, a button on the mouse. The cursor is positioned by means of a roller ball on the underside of the mouse, which generates directional commands as the mouse is moved by the user. That mouse movement is then translated by the operating system into movement of the cursor on the screen.

In a graphical user interface, icons typically represent computer objects such as files and folders that can be manipulated by the user. A single object is selected by positioning the cursor over the icon associated with the object and clicking the mouse. The object is launched by double-clicking on the icon. Additionally, the object may be moved by clicking on the icon and holding the mouse button down while moving the mouse. Once the object has been moved to the desired location, the mouse button is released, and the object is left at the new location. This is known as "dragging and dropping."

Drop-down menus organize numerous computer operations into major headings and display the headings across the top of a computer screen. The headings each contain a menu that drops down when the heading is clicked to allow access to the operations listed in the drop-down menu. The operations may be tools, controls, commands, macros or procedures. In this way, drop-down menus provide a space-efficient means of displaying numerous operations.

Dialog boxes generally contain information concerning a particular operation and pop-up when the associated operation is invoked. Also, when a requested operation cannot be carried out by the computer because of a problem, a dialog box is used to inform the user of that problem.

Toolbars provide an alternative to drop-down menus for displaying numerous computer operations. Toolbars comprise a series of buttons arranged along a bar. Typically, a toolbar is disposed along the top of an application window, although it may also be docked along another side or even may be free floating.

The buttons are each bound to an operation such that when a button is clicked with the mouse button, the bound operation is invoked. The type of operations bound to the buttons of a toolbar depend on the type of application program of the toolbar. For example, word processing toolbars generally include buttons for setting the size, style, and alignment of text while spreadsheet toolbars generally include buttons for formatting, sorting, and graphing data.

A graphical representation of the associated operation is displayed on each button. Graphical representations are used to minimize the size of the buttons, and thus the toolbar, which maximizes the amount of monitor space available for displaying other information or data.

A toolbar provides a user with direct access to computer operations, as opposed to the indirect access afforded by drop-down menus. To balance the convenience of toolbars against their size, toolbars may be customized. This allows a user to maximize the benefit of a toolbar while minimizing its size by placing on the toolbar only those buttons for operations that are frequently used.

The capabilities of toolbars have been expanded in the prior art to include buttons for specific objects. With this capability, a button can be added to a toolbar and associated with an object such that an operation of the object is invoked by simply clicking the button.

For application programs operating in a "WINDOWS" operating system environment, the prior art method of adding a button for an object to a toolbar involves entering a special customize mode from a toolbar menu. In the customize mode, a user drags the object from a list to the toolbar and drops the object at the button's desire position on the toolbar. The button is bound to a predetermined operation for the object type and added to the toolbar by a button creation routine.

The prior art process, however, involves a number of steps. Because of this, many users may not utilize the capability of adding object associated buttons to a toolbar. Therefore, a need exists in the art for a system for, and method of, intuitively and simply adding an object associated button to a toolbar.

SUMMARY OF THE INVENTION

The present invention provides a better solution to solving the problems in the art described above by providing a method and system for intuitively adding a button, or other type of control, to a toolbar, or other region for holding a control. A control is added by dragging an object to a region for holding controls and dropping the object at the desired location of the control in the region. In response to the object being dropped in the region for holding controls, a control is created and bound to an operation of the object.

Upon detecting a moving event of an object, the method and system of the present invention determine the destination of the object. If the destination is in a region for holding controls, such as a toolbar, a control is created in that region and bound to an operation of the object.

In the preferred embodiment, a moving event is initiated by a user and conducted by means of an input device, such as a mouse. An object is respectively selected and released with the mouse by down-clicking and up-clicking an icon of the object. Information concerning movement of the mouse and that of a corresponding cursor and concerning the selection and release of an object is provided by the operating system in the preferred embodiment.

Thus, it is an object of the present invention to provide a system for, and method of, adding a control to a region for holding controls.

It is another object of the present invention to provide a system for, and method of, intuitively adding a control to a region for holding controls.

It is a further object of the present invention to provide a system for, and method of, intuitively adding an object associated control to a region for holding controls.

Further objects, features and advantages of the present invention will become apparent upon reviewing the following description of the preferred embodiments of the invention, when taken in conjunction with the drawings and appended claims.

DETAILED DESCRIPTION

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Figure 1:
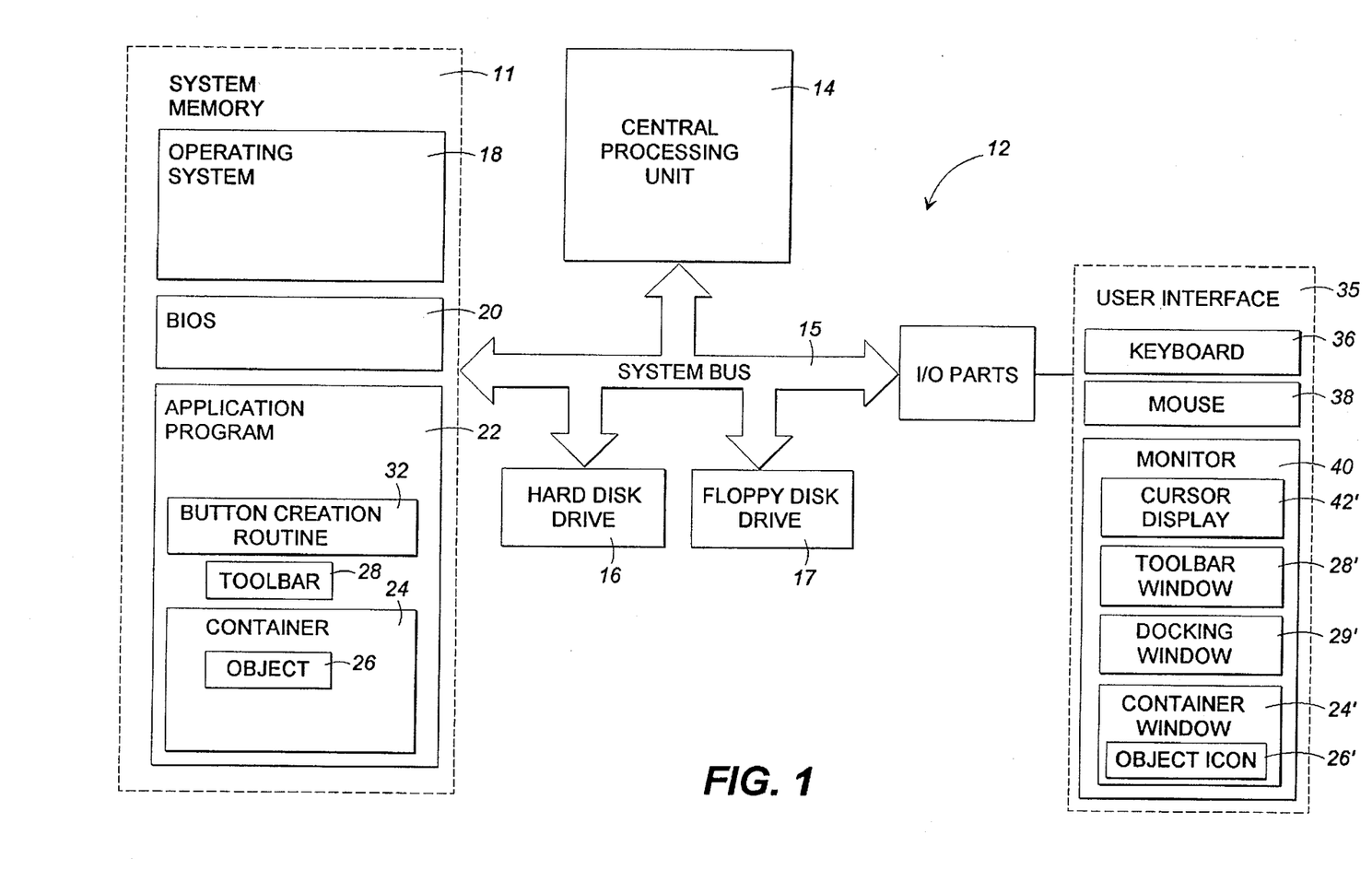
FIG. 1 is a block diagram of the components of a computer system used in connection with the preferred embodiment of the present invention for adding a button to a toolbar.

Referring now to the drawings, in which like numerals refer to like parts throughout the several views, FIG. 1 shows the components of the preferred operating environment, a computer system 12. The computer system 12 comprises a central processing unit (CPU) 14 that operates the computer system 12 in conjunction with a graphic-based operating system 18 to retrieve, process, store, and display data.

The CPU 14 is typically implemented as a microprocessor, such as the models 80386 or 80486 manufactured by Intel Corporation, Santa Clara, Calif. The CPU 14 communicates, by means of control, address, and data signals, with the operating system 18 and with the remaining components of the computer system 12 through a system bus 15.

The operating system 18 comprises a set of computer programs that control the internal functions of the computer system 12 thereby allowing the computer 12 to run application software. The operating system 18 is installed in a mass storage device, such as a hard disk drive 16, a floppy disk drive 17, or a ROM chip (not shown). During boot up (initialization) of the computer system 12, the operating system 18 is loaded into the system memory 11.

A computer-implemented application program 22 is also loaded into system memory 11 from the hard disk drive 16 or the floppy disk drive 17. The application program 22 operates in conjunction with the operating system 18 to provide windows for visual display of information.

The application program 22 includes an object container 24 having one or more objects 26. As used herein, the phrase "object container" means a container, folder, directory or other configuration for holding objects. The term "object" is used herein to mean a variable capable of comprising routines and/or data that is treated as a distinct entity.

The application program 22 also includes a region for holding controls. As used herein, the term "control" means a visual representation that can be manipulated by a user to perform an operation. In the preferred embodiment, the region for holding controls is a toolbar 28, and the control is a button.

A basic input/output system (BIOS) program 20 is stored in system memory 11 along with the operating system 18. The BIOS program 20 supplies the device-level control or support services for the primary input/output devices of the computer during the boot process. After a boot, the BIOS program 20 accepts requests from the application program 22 and from the operating system 18 running on the computer system 12 and performs input/output services as requested by those programs. The functions and operations of conventional BIOS programs are well known and will not be further described herein.

A series of peripheral ports 34 are provided on the system bus 15 for receiving and transmitting data via a user interface 35. The user interface 35 includes a keyboard 36 and an input device for entering data. As used herein, the phrase "input device" means a mouse, trackball, track pad, or any other pointing device for positioning a cursor on a computer screen. In the preferred embodiment, the input device is a mouse 38. Data is graphically displayed by a monitor 40.

The mouse 38 operates in conjunction with a cursor 42 displayed on the monitor 40. The cursor 42 display is constructed around a single-pixel hot spot that corresponds to the precise position of the cursor 42 on the monitor 40. The cursor 42 is positioned by means of a roller ball on the underside of the mouse 38, which generates directional commands as the mouse 38 is moved by the user. That mouse movement is then translated by the operating system 18 into movement of the cursor 42 on the monitor 40. As is well known in the art, a user can select, launch, and move objects by moving and clicking the mouse 38.

In the preferred embodiment, the operating system 18 is the "WINDOWS" operating system manufactured by the assignee in this application, Microsoft Corporation of Redmond, Wash. Those skilled in the art, however, understand that the invention can be implemented in other graphic operating systems, such as the "OS/2" operating system manufactured by IBM and the "MACINTOSH" operating system manufactured by Apple Computer, Inc.

The preferred application program 22 is the "MICROSOFT ACCESS" program manufactured by Microsoft Corporation. This invention, however, is applicable to other types of application programs that operate in a graphical user interface environment and that include toolbar capabilities.

Briefly described, the "MICROSOFT ACCESS" application program is an interactive relational database for the "WINDOWS" operating system. The objects 26 may be of several different types, including tables, queries, forms, reports, macros, or modules. The "MICROSOFT ACCESS" application program includes a button creation routine 32 for customizing the toolbar 28 in accordance with the present invention.

Figure 2:
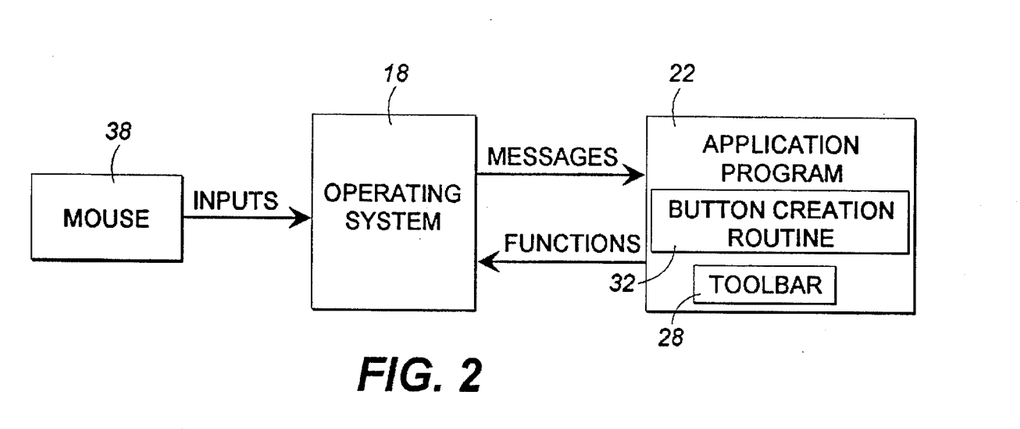
FIG. 2 is a block diagram of the interface between an input device, an operating system, and an application program used in connection with the preferred embodiment of the present invention for adding a button to a toolbar.

As best shown by FIG. 2, the operating system 18 provides the interface between the computer's resources, the user, and the application program 22. The operating system 18 receives and interprets user inputs. On the basis of the inputs, the operating system 18 directs a variety of messages to the application program 22. A "window procedure" in the application program 22 responds to messages received from the operating system 18. The window procedure examines each message and performs certain operations based on the message or passes the message back to the operating system 18 for default processing.

In the context of the present invention, the primary interaction between the application program 22 and the operating system 18 involves information concerning cursor movement and the selection and release of objects. It will be understood by those skilled in the art, however, that information concerning cursor movement and the selection and release of objects can be independently derived or obtained from other sources within the scope of the present invention.

In the preferred embodiment, information concerning cursor movement and the selection and release of objects is conveyed to the application program 22 through window-management messages of the operating system 18. The window-management messages comprise mouse movement messages that convey information concerning cursor movement and mouse click messages that convey information concerning the selection and release of objects.

A mouse movement message is sent each time the mouse is moved by the user and includes parameters that indicate the current position of the cursor hot-spot. Mouse click messages include a down-click message for object selection when the button on the mouse 38 is clicked down and an up-click message for object release when the button on the mouse 38 is clicked up, or released.

Window-management messages are typically directed to the application program of the window currently containing the cursor 42. However, the application program 22 can capture the mouse in response to a dragging operation from its window. In such a case, the application program 22 will continue receiving window-management messages even if the cursor is moved to another window, which, in turn, becomes the target window. As used herein, the phrase "target window" means the window containing the cursor 42 during a dragging operation. The application program 22 captures and releases the mouse 38 by calling the appropriate operating system functions.

The cursor 42 is a shared resource. As a shared resource, its display on the monitor 40 is controlled by the application program of the window currently containing the cursor 42. The application program 22 sets the cursor display by calling the appropriate operating system function.

Further information regarding the "WINDOWS" operating system and its interaction with application programs is available from a variety of publications, including the Guide to Programming, which is part of the Microsoft Windows Software Development Kit (published by Microsoft), the Win32 Programmer's Reference (published by Microsoft Press), and Programming Windows 3.1 (published by Microsoft Press), all of which are incorporated herein by reference. Additional information regarding the "MICROSOFT ACCESS" application program is available from the documentation distributed with Version 2.0. This documentation is incorporated herein by reference.

Figure 3:
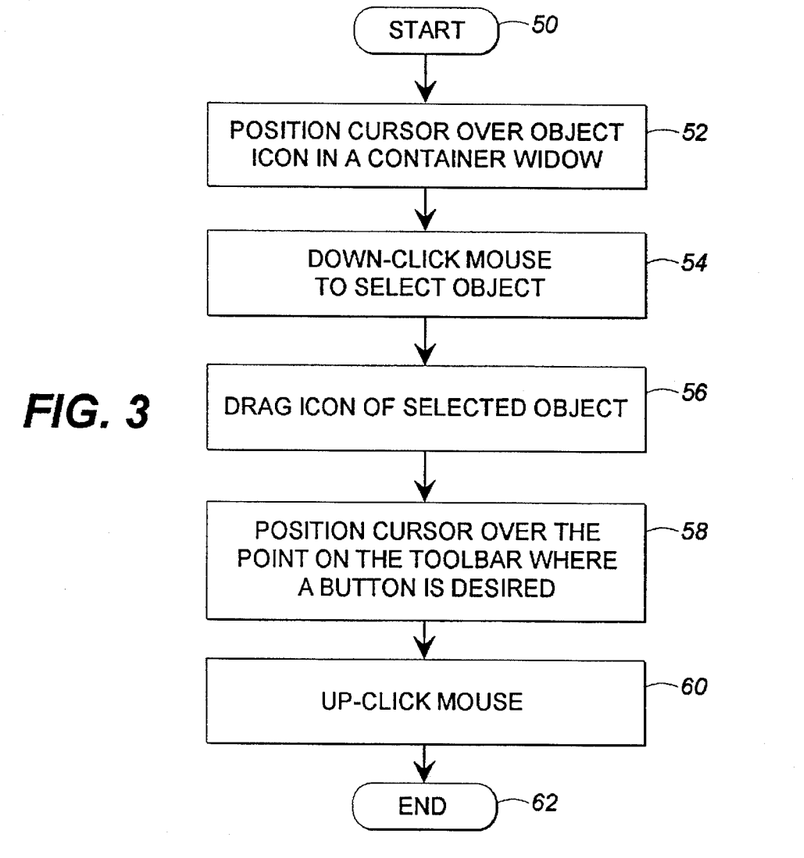
FIG. 3 is a logical flow diagram from a user's perspective of the process for adding a button to a toolbar in accordance with the-preferred embodiment of the present invention.

As shown by FIG. 3, the process of the present invention by which a user adds a button to a toolbar begins at step 50 and proceeds to step 52. Screen displays of the user process are shown by FIGS. 4A–G for the "MICROSOFT ACCESS" application program 22 of the preferred embodiment.

Figure 4A:
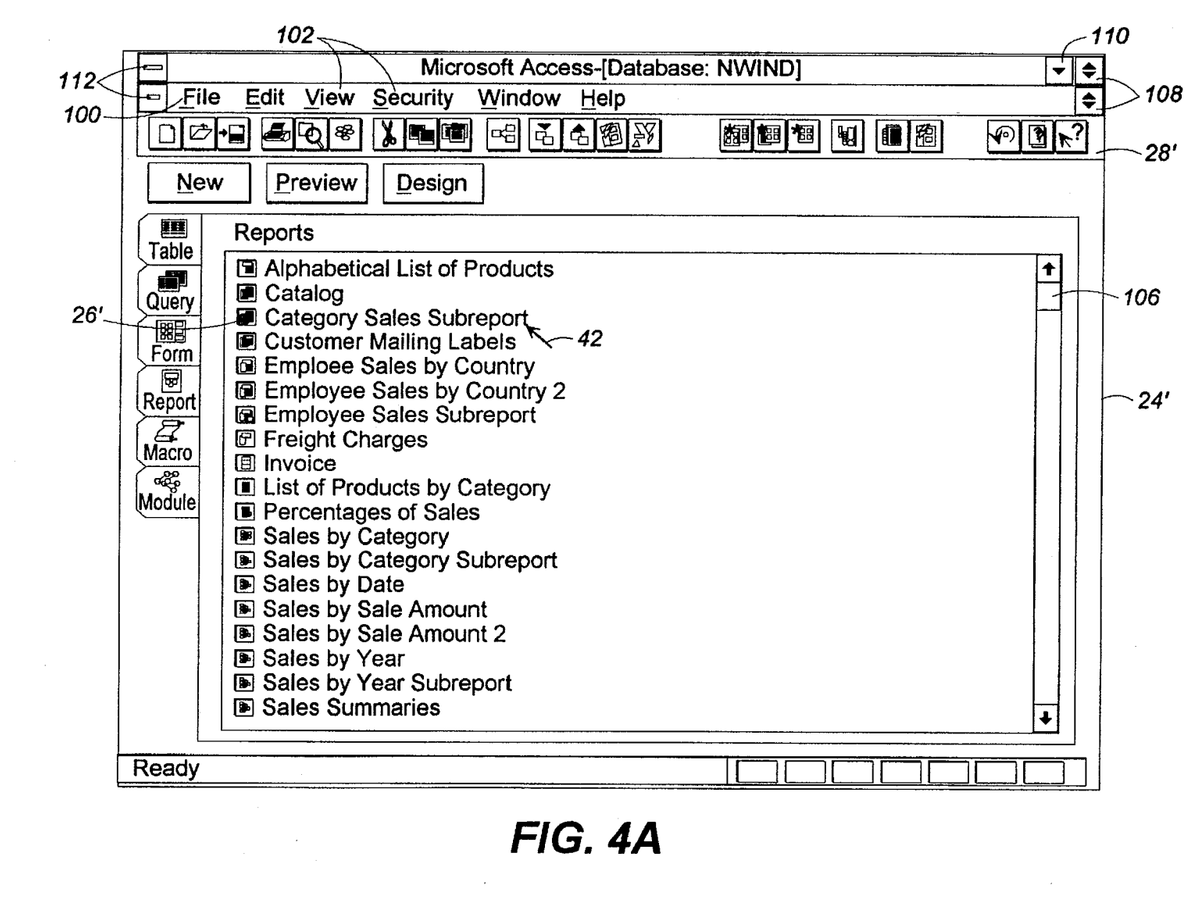
FIGS. 4A–4G are screen displays showing the process for adding a button to a toolbar in accordance with the preferred embodiment of the present invention from the user's perspective.
Figure 4B:
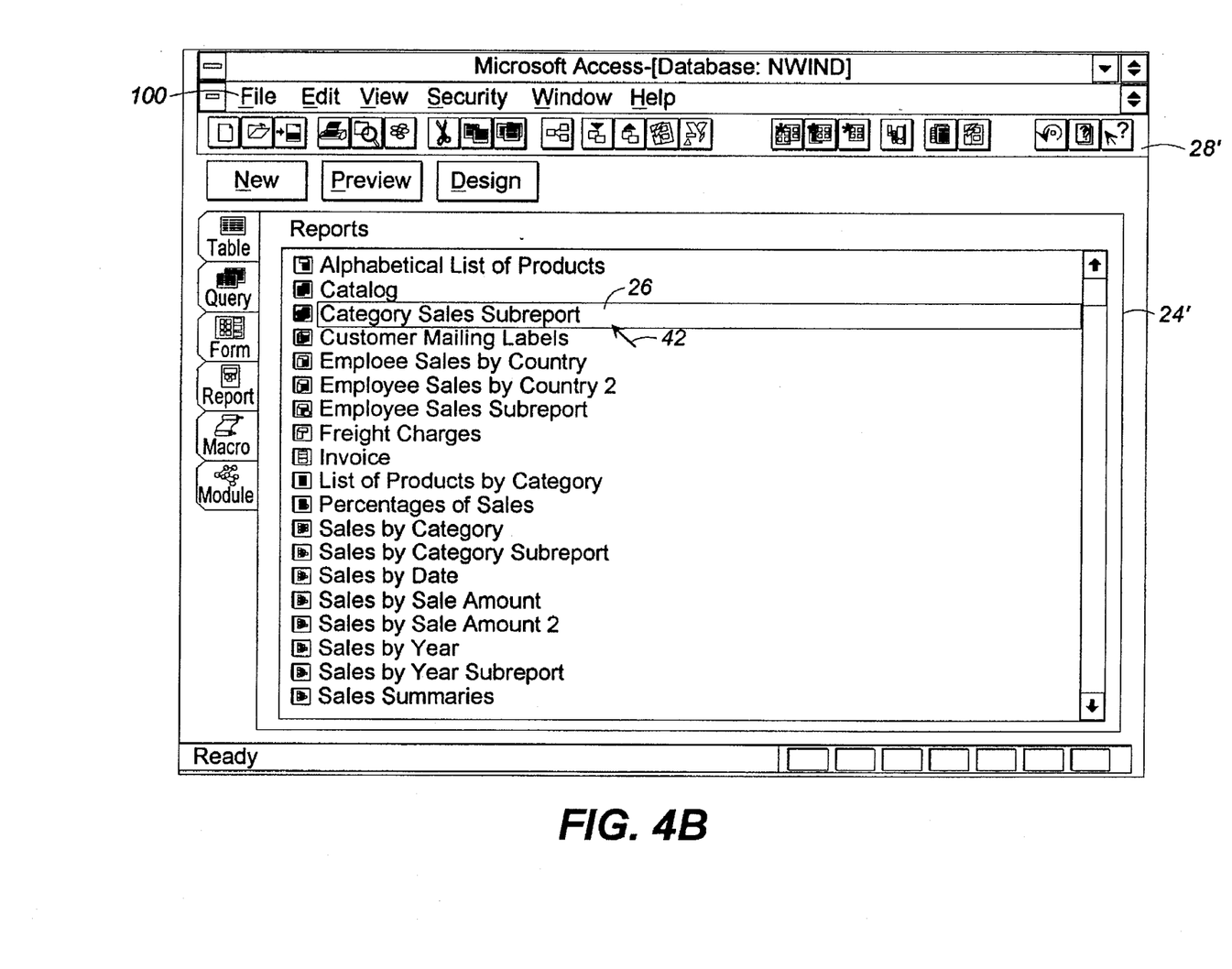

As shown by FIG. 4A, the user display screen comprises a menu bar window 100 with a variety of pull down menus 102 disposed along the top edge of the screen. A vertical scroll bar 106 is positioned along the right edge of a container window 24'. Restore boxes 108 and a minimize box 110 are positioned at the top right corner of the container window 24'. Control menu boxes 112 are located at the top left corner of the container window 24'. A tool bar window 28' is displayed immediately above the container window 24'.

At step 52, the user positions the cursor 42 over a visual representation of the object 26 by means of the mouse 38. In the preferred embodiment, the visual representation is an icon 26'. Proceeding to step 54, the user selects the icon 26' by positioning the cursor 42 over the icon 26' and by down-clicking the mouse 38. This step is best shown by the screen display of FIG. 4B in which the selected icon 26' is highlighted.

Figure 4C:
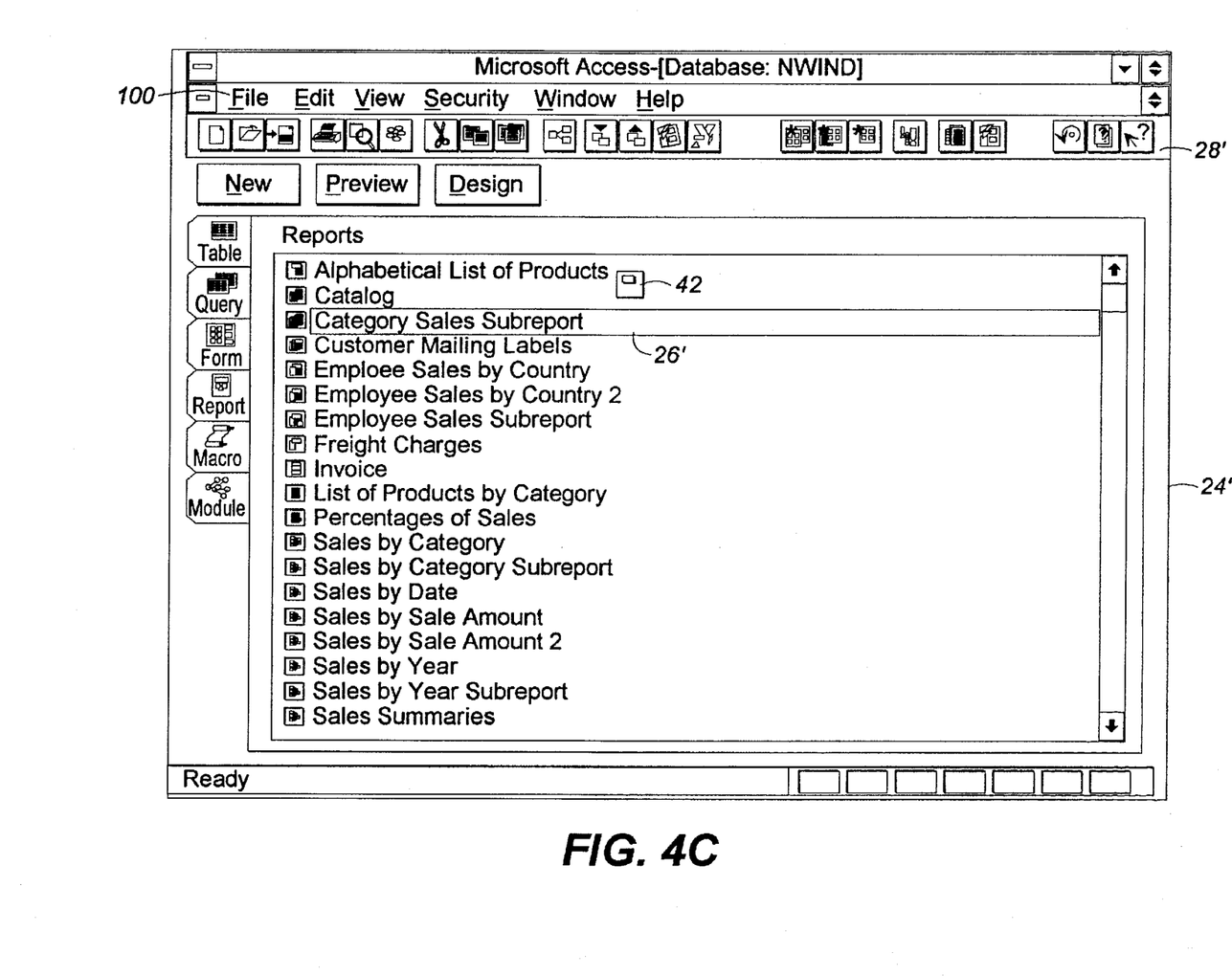

Next, at step 56, the user drags the selected icon 26' from its original location. As shown by the screen display of FIG.

4C, the cursor 42 changes from an arrow design to a "positive cursor". As used herein, the phrase "positive cursor" means a positive image of the cursor design that indicates to the user that the object 26 can be dropped over the target window.

In the preferred embodiment, the positive cursor is the same design as the icon 26'. Those skilled in the art will understand, however, that other positive cursor designs can be used within the scope of the present invention.

Figure 4D:
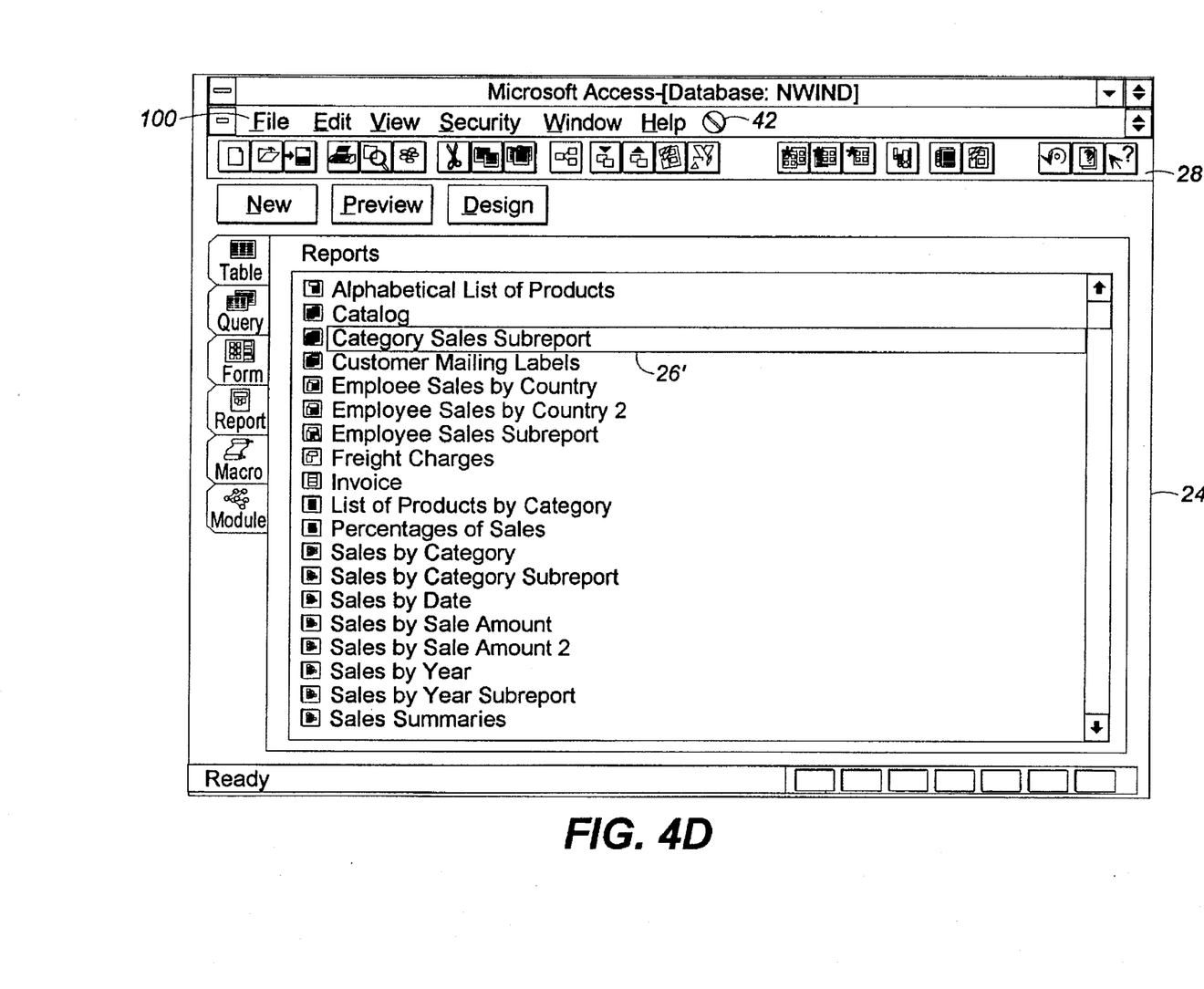

As best shown by FIG. 4D, the icon design changes to a "negative cursor" if the cursor 42 is moved over a window where the object 26 cannot be dropped. As used herein, the phrase "negative cursor" means a negative image of the cursor design that indicates to the user that the object 26 cannot be dropped over the target window.

In the preferred embodiment, the negative cursor is the "no" symbol, which is a circle with a line through it. Those skilled in the art will understand, however, that other negative cursor designs can be used within the scope of the present invention.

Figure 4E:
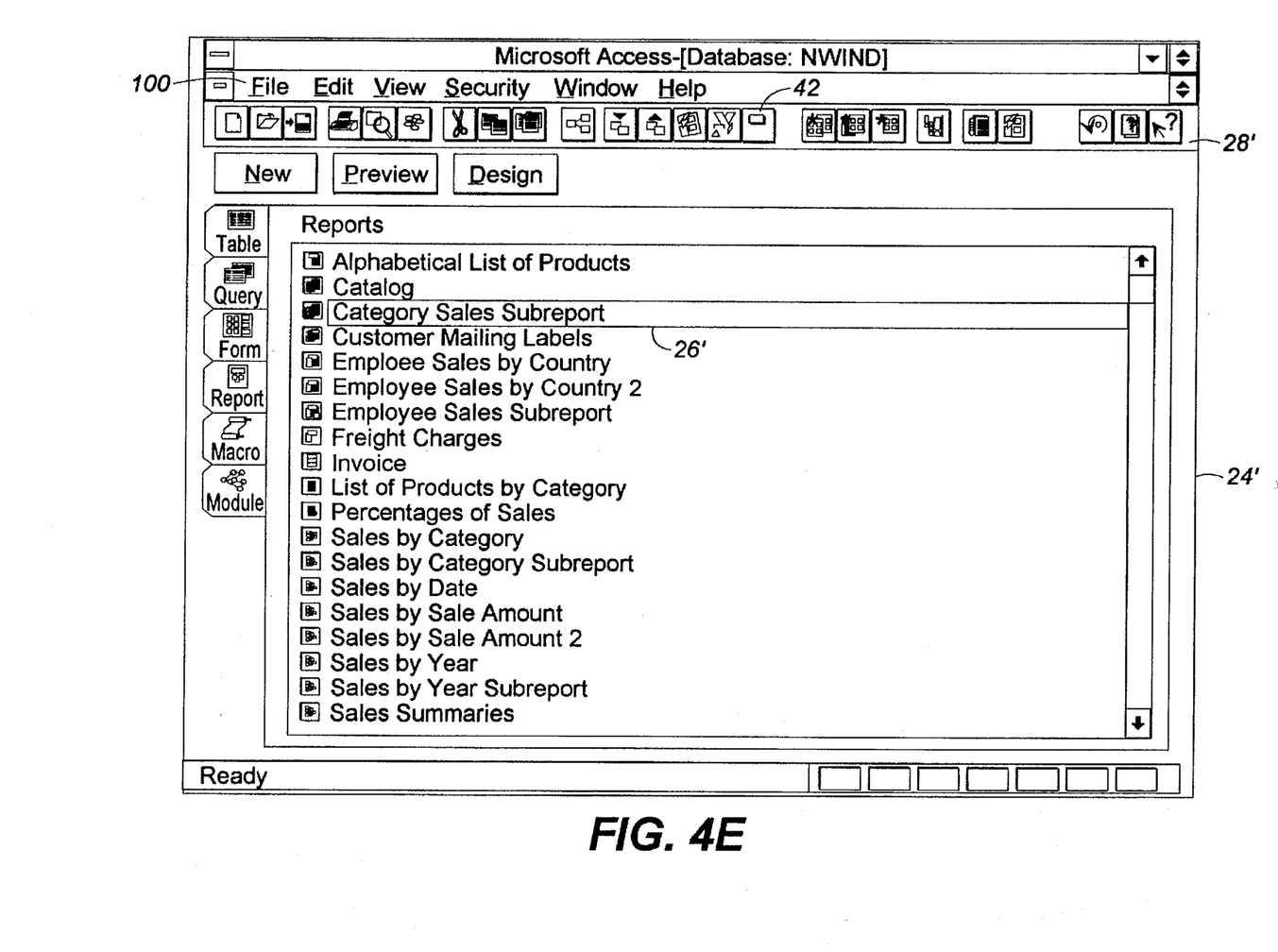

Proceeding to step 58, the user selects the destination of the object by positioning the cursor 42 over the desired point on the toolbar window 28' where an object associated button is desired. This step is shown by FIG. 4E. The user then up-clicks (releases) the mouse 38 at step 60 to drop the icon 26' at that location on the toolbar window 26'.

Upon the icon 26' being dropped, the method and system of the present invention create an object associated button 115, bind it to an operation, and add the button 115 to the toolbar 28. As used herein, the term "bind" means to associate a button with an operation such that the operation is invoked when the button is actuated. The term "operation" is used herein to mean a set of computer instruction for performing a specific task.

Figure 4F:
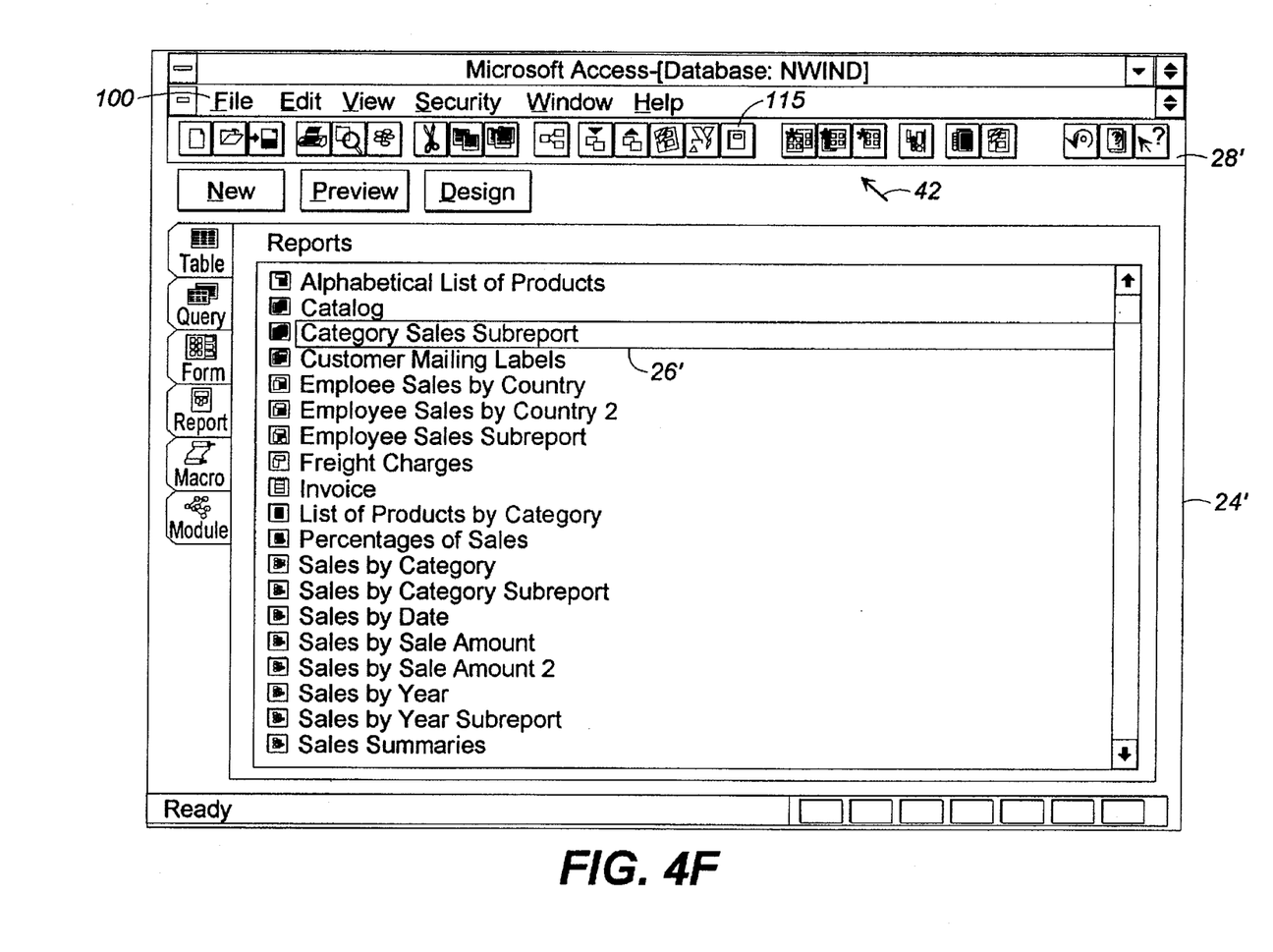
Figure 4G:
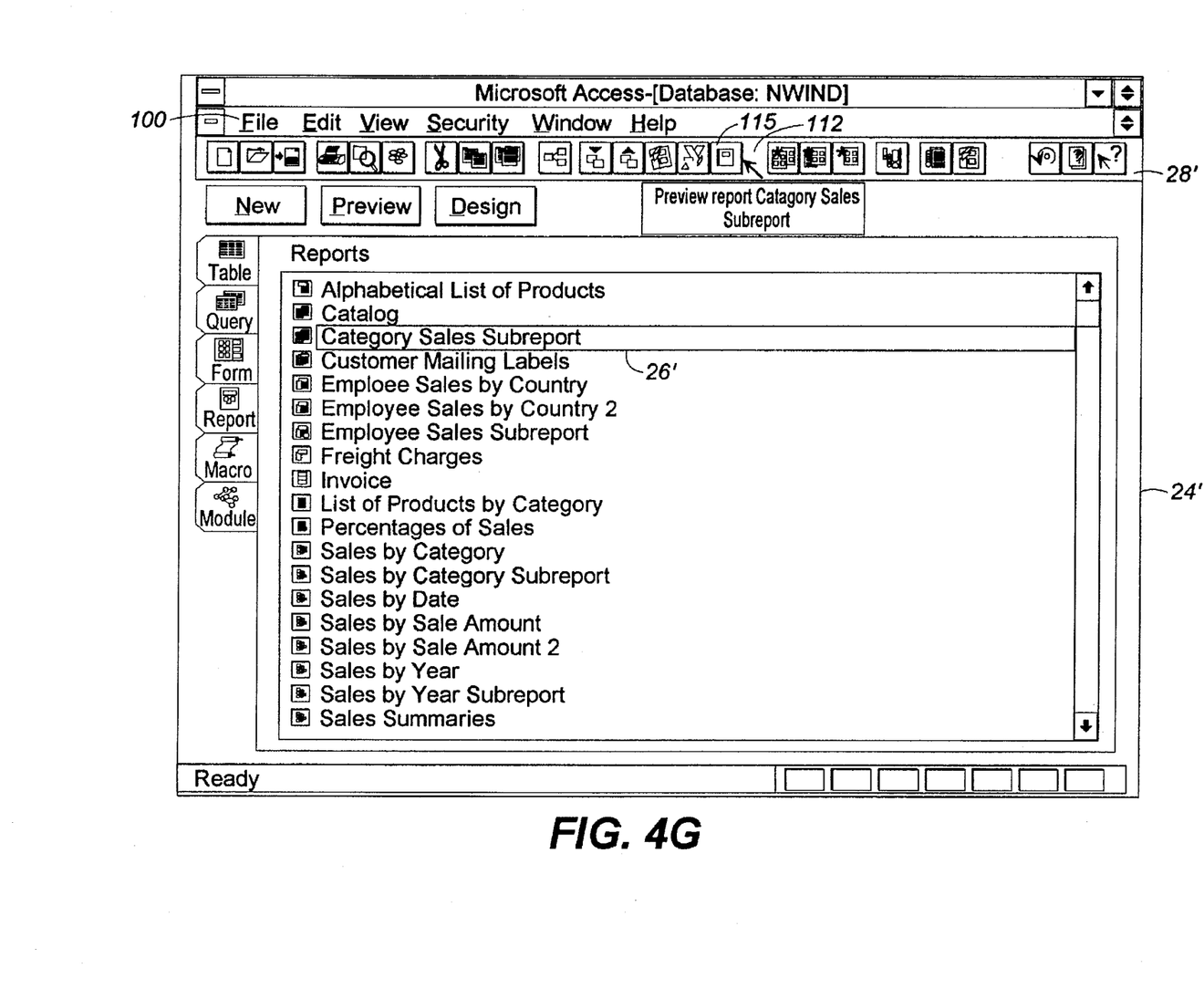

As shown by the display screen of FIG. 4F, the object associated button 115 displays the same icon as the icon 26'. To further associate the button 115 with the object 26, the name of the object 26 and the operation to be invoked are displayed when the cursor is located over the object associated button 115. This feature is best shown by FIG. 4G.

Thus, the present invention allows users to intuitively add an object associated button to a toolbar by simply dragging the icon of the object to the toolbar window and dropping the icon at the desired location of the button. As a result, a user can add an object associated button to a toolbar without resort to the lengthy processes of the prior art. Furthermore, because the process by which a user adds a button to a toolbar is intuitive, the user can discover it without reference to a user's manual or other materials.

Figure 5:
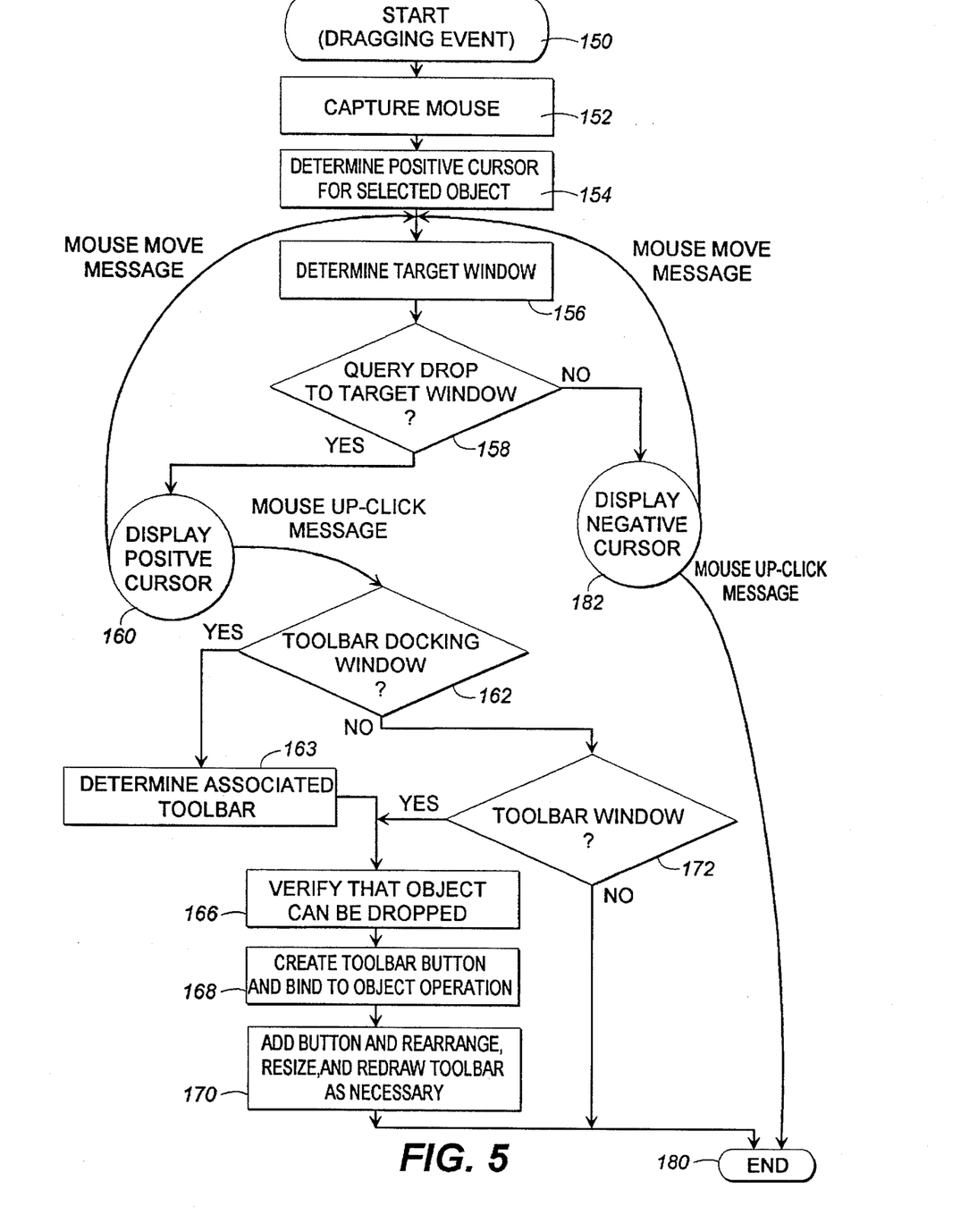
FIG. 5 is a logical flow diagram of the process implemented by the application program for adding a button to a toolbar in accordance with the preferred embodiment of the present invention.

As shown by FIG. 5, the method of the present invention for adding a button to a toolbar begins at step 150 with a moving event and proceeds to step 152. As used herein, the phrase "moving event" means the selection and movement of an object. In the preferred embodiment, the moving event is a down-click message followed by a mouse movement message.

At step 152, the application program 22 sends a mouse capture function to the operating system 18. The mouse capture function causes the operating system 18 to direct window-management messages to the application program 22 during the dragging operation.

Proceeding to step 154, the application program 22 determines a positive cursor for the selected object 26. In the preferred embodiment, the positive cursor is determined from the object container 24 and is the same design as the icon 26'. Next, at step 156, a target window is determined based on the current position of the cursor hot-spot, which is received from the operating system 18. The method of determining the target window is well known in the art and will not be further described herein. Step 156 leads to decisional step 158.

At decisional step 158, the application program 22 queries the target window whether the object 26 can be dropped therein. If the object 26 can be dropped, the YES branch of decisional step 158 leads to state 160. At state 160, the application program 22 sets the cursor function to display the positive cursor. The method of the present invention remains in state 160 until a mouse movement or up-click message is received from the operating system 18. If a mouse movement message is received from the operating system 18, the mouse move branch of state 160 returns to step 156 wherein the target window is determined.

If an up-click message is received from the operating system 18, the target window in the destination of the object and the mouse up-click branch of state 160 leads to decisional step 162. At decisional step 162, it is determined if the target window is a toolbar docking window 29'. A toolbar docking window 29' is a free floating window that displays a toolbar 28 and that is associated with the toolbar 28.

In the preferred embodiment of the present invention, the target window is aware of its own type. Thus, decisional step 162 is implied. Decisional step 162 is included herein to fully describe the method of the present invention for the benefit of the reader.

If the target window is a toolbar docking window 29', the YES branch of decisional step 162 leads to step 164 where the associated toolbar 28 is determined. Proceeding to step 166, the application program 22 verifies that the object can be dropped onto the toolbar 28.

Next, at step 168, the application program 22 creates an object associated button 115 and binds it to an operation of the object 26. In the preferred MICROSOFT ACCESS application program 22, the bound operation varies with the type of object 26. For a table, report, form, or query object, the preferred operation is to open the associated object 26. The preferred operation for macro objects is to run the associated macro. Those skilled in the art will understand that other operations may be bound to the same or different types of objects within the scope of the present invention.

At step 170, the object associated button 115 is added to the toolbar 28 and the toolbar 28 is rearranged, resized, and redrawn as necessary to accommodate the object associated button 115. Thereafter, actuating the object associated button 115 causes the bound operation of the object 62 to be invoked.

When the object associated button 115 is added to the toolbar 28, it is stored as part of the toolbar 28. Accordingly, the object associated button 115 is available from the toolbar 28 each time the application program 22 of the toolbar 28 is opened and the toolbar 28 displayed therewith.

In the preferred embodiment, steps 168 and 170 are accomplished by the application program 22 by calling a button creation routine 32 and passing to it the object type, the object path, and the position of the cursor hot spot when the object 26 was dropped. Button creation routines are well known in the prior art and thus will not be further described herein.

Returning to decisional step 162, if the target window is not a toolbar docking window 29', the NO branch of decisional step 162 leads to decisional step 172. At decisional step 172, it is determined if the target window is a toolbar window 28'. As described above, the target window is aware of its own type in the preferred embodiment. Thus, decisional step 172 is implied. Decisional step 172 is included herein to fully describe the method of the present invention for the benefit of the reader.

If the target window is not a toolbar window 28', the NO branch of decisional step 172 leads to step 180 wherein the method of the present invention is ended. If the target window is a toolbar window 28', the YES branch of decisional step 172 leads to step 166 wherein the application program 22 verifies that the object 26 can be dropped onto the toolbar 28.

Returning to decisional step 158, if the object 26 cannot be dropped to the target window, the NO branch of decisional step 158 leads to state 182. At state 182, the application program 22 sets the cursor function to display the positive cursor, which indicates that the object 26 cannot be dropped. The method of the present invention remains in state 182 until a mouse movement or up-click message is received from the operating system 18. If a mouse movement message is received from the operating system 18, the mouse move branch of state 182 returns to step 156 wherein the target window is determined.

If up-click message is received from the operating system 18, the mouse up-click branch of state 182 leads to step 180 wherein the method of the present invention is ended.

Those skilled in the art will understand that the various steps of the present invention include other error branches that cause the method to abort if an error condition such as a lack of free memory exists in the computer system 12. Such error branches are well known in the art and are not directly related to the present invention. Accordingly, they will not be further described.

Thus, upon detecting a moving event, the method and system of the present invention determine the destination of the object. If the destination is in a region for holding controls, such as a toolbar, a control is created in that region and bound to an operation of the object. Thereafter, actuating the control causes the bound operation to be invoked.

From the foregoing description of the preferred embodiments and the several alternatives, other alternative constructions of the present invention may suggest themselves to those skilled in the art. Therefore, the scope of the present invention is to be limited only to the claims below and the equivalents thereof.

I claim:

1. A method for adding a control to a region for holding controls, comprising the steps of:
   displaying a region for holding controls;
   displaying a container including a plurality of objects of a predetermined type;
   identifying a default operation associated with the plurality of objects in the container;
   detecting the selection and movement of one of the plurality of objects;
   detecting the placement of the selected object;
   in response to the placement of the selected object in the region for holding controls, creating a control in the region for holding controls; and
   associating the control with the default operation and the selected object,
   whereby subsequent actuation of the control results in the default operation being performed on the selected object.

2. The method recited in claim 1, wherein the plurality of objects represent data files of a predetermined type.

3. The method recited in claim 1, wherein the default operation includes viewing files corresponding to the displayed objects.

4. The method recited in claim 1, further comprising the steps of:
   determining the position of the selected object; and
   in response to the selected object being positioned over the region for holding controls, displaying a positive icon.

5. The method recited in claim 1, further comprising the steps of:
   determining the position of the selected object; and
   in response to the selected object being positioned over an area in which the object cannot be placed, displaying a negative icon.

6. A computer-readable medium on which is stored a computer program for adding a control to a region for holding controls, the computer program comprising instructions which, when executed by a computer, perform the steps of:
   displaying a region for holding controls;
   displaying a plurality of objects of a predetermined type;
   identifying a default operation associated with the plurality of objects;
   detecting the selection and movement of one of the plurality of objects;
   detecting the placement of the selected object;
   in response to the placement of the selected object in the region for holding controls, creating a control in the region for holding controls; and
   associating the control with the default operation and the selected object,
   whereby subsequent actuation of the control results in the default operation being performed on the selected object.

7. The computer-readable medium of claim 6, wherein the plurality of objects represent data files of a predetermined type.

8. The computer-readable medium of claim 6, wherein the default operation includes viewing files corresponding to the displayed objects.

9. The computer-readable medium of claim 6, wherein the computer program further comprises instructions which, when executed by a computer, perform the steps of:
   determining the position of the selected object; and
   in response to the selected object being positioned over the region for holding controls, displaying a positive icon as a cursor.

10. The computer-readable medium of claim 6, wherein the computer program further comprises instructions which, when executed by a computer, perform the steps of:
    determining the position of the selected object; and
    in response to the selected object being positioned over an area in which the moved object cannot be placed, displaying a negative cursor.

11. A computer system for adding a control to a region for holding controls, comprising:
    a processing unit;
    an input device connected to the processing unit; and
    a display device coupled to the processing unit for displaying the region for holding controls;

the processing unit, responsive to instructions from a program module running on the computer system, being operative to:
  display the region for holding controls;
  display a container including a plurality of objects representing data files of a predetermined type;
  identify a default operation associated with the data files represented by the plurality of objects;
  detect the selection of one of the plurality of objects;
  detect the placement of the selected object;
  in response to the placement of the selected object in the region for holding controls, create a control in the region for holding controls; and
  bind the control to the default operation and the selected object,
whereby subsequent actuation of the control results in the default operation being performed on the data file represented by the selected object.

12. The computer system recited in claim 11, wherein the default operation includes viewing files corresponding to the displayed objects.

13. The computer system recited in claim 11, wherein the processing unit is further operative to:
  determine the position of the placed object; and
  in response to the placed object being positioned over the region for holding controls, display a positive icon as a cursor.

14. The computer system recited in claim 11, wherein the processing unit is further operative to:
  determine the position of the placed object; and
  in response to the placed object being positioned over an area in which the object cannot be placed, display a negative cursor.

* * * * *